Patented June 10, 1930

1,763,619

UNITED STATES PATENT OFFICE

LORIN B. SEBRELL, OF AKRON, OHIO, ASSIGNOR TO THE GOODYEAR TIRE & RUBBER COMPANY, OF AKRON, OHIO, A CORPORATION OF OHIO

METHOD OF VULCANIZING CAOUTCHOUC AND THE PRODUCT DERIVED THEREFROM

No Drawing. Original application filed September 13, 1927, Serial No. 219,365. Divided and this application filed June 12, 1928. Serial No. 284,888.

My invention relates to the treatment of rubber and it has for its primary object the provision of a desirable material for accelerating the vulcanization of rubber products.

More specifically my invention has for one of its objects the provision of an accelerator which is composed of the reaction products of a mercaptothiazole and an aldehyde amine condensation product.

This application is a division of application Serial No. 219,365, filed September 13, 1927.

It has previously been known that mercaptothiazoles were powerful accelerators of the vulcanization of rubber products. It has also been known that the mercaptothiazoles might be caused to react with other substances, such as metallic salts, aldehydes, ammonia and amines, to produce accelerators which were, in many cases, superior to the mercaptothiazoles from which they were derived.

I have made the discovery that mercaptothiazoles, such as mercaptobenzothiazoles, may be caused to react with aldehyde amine condensation products, known as Schiff bases, to produce accelerators having very desirable properties. The general formula of a Schiff base is represented as follows:

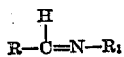

The radicals indicated by the characters R and R₁ may be either straight chain or cyclic hydrocarbons.

This class of compounds includes the reaction products of crotonaldehyde and aniline, (crotylidene aniline), acetaldehyde and aniline (ethylidene aniline), crotonaldehyde methylamine, propyl aldehyde and ethylamine, butyl aldehyde, aniline, butyl aldehyde toluidine, heptaldehyde aniline, heptaldehyde butyl amine, aniline cinnamic aldehyde, and numerous other hydrocarbon compounds which include the grouping indicated in the formula.

A specific example of a compound which falls within the scope of my invention is the crotonaldehyde aniline mercaptobenzothiazole reaction product. This material may be prepared as follows:

Intermix molecular quantities of the mercaptobenzothiazole and the crotonaldehyde aniline reaction products, and reflux them for a period of two hours or more. An exothermic reaction takes place during this period. Also, water and hydrogen sulphide are given off, as is evident from the odor and the appearance of the condensate. The product obtained is a thick semi-solid which may be hardened to a resin-like state by distilling off a little aniline. The chemical formula of the reaction product is unknown. It is to be understood that this method of preparing the reaction product of the mercaptothiazole and the Schiff bases is of general application, and may be employed to manufacture various other materials of this class, which have been mentioned.

The material prepared according to the above described method may be incorporated into various rubber compounds. The following is a sample formula of a compound which insures excellent results:

Pale crepe rubber _____ 100 parts
Zinc oxide _____ 5 parts
Sulfur _____ 3 parts
Stearic acid _____ 1.5 parts
Accelerator _____ .5 part The accelerative properties of the material prepared according to the method discussed were tested in the above formula and the results obtained are tabulated in the following tables.

TABLE I

*Mercaptobenzothiazole control*

| Cure | | 500 per cent elong. kgs/cm² | 700 per cent elong. kgs/cm² | Tensile strength kgs/cm² | Per cent elong. at break |
|---|---|---|---|---|---|
| Time in mins. | Pressure | | | | |
| 20 | Pounds 20 | 13 | 35 | 117 | 940 |
| 40 | 20 | 22 | 72 | 156 | 840 |
| 60 | 20 | 24 | 84 | 171 | 825 |
| 90 | 20 | 28 | 102 | 180 | 800 |

TABLE II

*Crotylidene aniline control*

| Cure | | 500 per cent elong. kgs/cm² | 700 per cent elong. kgs/cm² | Tensile strength kgs/cm² | Per cent elong. at break |
|---|---|---|---|---|---|
| Time in mins. | Pressure | | | | |
| | *Pounds* | | | | |
| 20 | 20 | No cure. | | | |
| 40 | 20 | 8 | 12 | 30 | 885 |
| 80 | 20 | 10 | 30 | 68 | 870 |

TABLE III

*Crotonaldehyde—Aniline—Mercaptobenzothiazole*

| Cure | | 500 per cent elong. kgs/cm² | 700 per cent elong. kgs/cm² | Tensile strength kgs/cm² | Per cent elong. at break |
|---|---|---|---|---|---|
| Time in mins. | Pressure | | | | |
| | *Pounds* | | | | |
| 30 | 20 | 27 | 103 | 190 | 810 |
| 60 | 20 | 40 | 158 | 210 | 750 |
| 90 | 20 | 37 | 147 | 228 | 780 |

TABLE IV

*Mercaptobenzothiazole solid ethylidene aniline*

| Cure | | 500 per cent elong. kgs/cm² | 700 per cent elong. kgs/cm² | Tensile strength kgs/cm² | Per cent elong. at break |
|---|---|---|---|---|---|
| Time in mins. | Pressure | | | | |
| | *Pounds* | | | | |
| 15 | 20 | 19 | 73 | 145 | 860 |
| 30 | 20 | 30 | 110 | 165 | 775 |
| 40 | 20 | 34 | 132 | 200 | 780 |
| 60 | 20 | 38 | 147 | 210 | 770 |
| 90 | 20 | 40 | 155 | 205 | 755 |
| 120 | 20 | 41 | 160 | 210 | 750 |

Tables I and II respectively contain data obtained by testing samples in which the pure mercaptobenzothiazole and crotylidene aniline were used as accelerators. Table III contains data obtained from tests conducted upon samples containing the reaction product of mercaptobenzothiazole and the crotonaldehyde aniline condensation product. Table IV contains data obtained from the testing of rubber samples containing the reaction products of mercaptobenzothiazole and ethylidene aniline. Comparison of the data contained in Tables I and II with that contained in Tables III and IV clearly indicates that the reaction products of the mercaptothiazoles and the Schiff bases are materially more powerful accelerators than either mercaptothiazole or crotylidene aniline alone.

Since the product resulting from the combination of the thiazole and the Schiff's base is a more powerful accelerator than either of the original compounds, it is evident that a true chemical reaction takes place. The latter fact may be further demonstrated by extracting the final product with an alkali. The latter treatment would remove any unreacted mercaptobenzothiazole in its orginal state. Since no free mercaptobenzothiazole is thus obtained, it is clear that it has combined with the Schiff's base.

Although I have disclosed only the preferred embodiments of my invention and described those embodiments in detail, it will be apparent to those skilled in the art that the invention is not so limited, but that various minor modifications may be made therein without departing from the spirit of the invention or from the scope of the appended claims.

What I claim is:

1. A method of treating rubber which comprises heating a vulcanizable rubber compound containing a reaction product of a mercaptothiazole with ethylidene aniline.

2. A method of treating rubber which comprises heating a vulcanizable rubber compound containing a reaction product of mercaptobenzothiazole with ethylidene aniline.

3. A method of treating rubber which comprises vulcanizing it in the presence of a reaction product of a mercaptothiazole with a reaction product of an aromatic amine and an aliphatic aldehyde.

4. A rubber product that has been vulcanized in the presence of a reaction product of a mercaptothiazole with ethylidene aniline.

5. A rubber product that has been vulcanized in the presence of a reaction product of a mercaptothiazole with a condensation product of an aromatic amine with an aliphatic aldehyde.

6. A rubber product that has been vulcanized in the presence of a reaction product of a mercaptobenzothiazole with ethylidene aniline.

7. A method of treating rubber which comprises subjecting it to vulcanization in the presence of a reaction product of a mercaptobenzothiazole and a derivative of an amino substituted benzene and an aliphatic aldehyde.

8. A method of treating rubber which comprises subjecting it to vulcanization in the presence of a reaction product of a mercaptobenzothiazole and a derivative of a primary amine containing a single benzene nucleus and an aliphatic aldehyde.

9. A method of treating rubber which comprises subjecting it to vulcanization in the presence of a reaction product of mercaptobenzothiazole and a derivative of a material selected from a group comprising aniline and toluidine and an aliphatic aldehyde selected from a group comprising acetaldehyde, croton aldehyde, butyl aldehyde and heptaldehyde.

10. A method of treating rubber which comprises subjecting it to vulcanization in the presence of a reaction product of mercaptobenzothiazole and a derivative of a primary aromatic amine containing a single benzene nucleus and an aliphatic aldehyde.

11. A rubber product that has been vulcanized in the presence of a reaction product of mercaptobenzothiazole and ethylidene aniline.

In witness whereof, I have hereunto signed my name.

Signed at Akron, in the county of Summit, and State of Ohio, this 11th day of June, 1928.

LORIN B. SEBRELL.